US012607254B2

(12) United States Patent
Maurel

(10) Patent No.: US 12,607,254 B2
(45) Date of Patent: Apr. 21, 2026

(54) DIFFERENTIAL DRIVE DEVICE

(71) Applicant: VALEO EMBRAYAGES, Amiens (FR)

(72) Inventor: Herve Maurel, Amiens (FR)

(73) Assignee: VALEO EMBRAYAGES, Amiens (FR)

( * ) Notice: Subject to any disclaimer, the term of this patent is extended or adjusted under 35 U.S.C. 154(b) by 0 days.

(21) Appl. No.: 18/855,535

(22) PCT Filed: Apr. 13, 2023

(86) PCT No.: PCT/EP2023/059610
§ 371 (c)(1),
(2) Date: Oct. 9, 2024

(87) PCT Pub. No.: WO2023/198803
PCT Pub. Date: Oct. 19, 2023

(65) Prior Publication Data
US 2025/0237298 A1     Jul. 24, 2025

(30) Foreign Application Priority Data

Apr. 14, 2022    (FR) ...................................... 2203460

(51) Int. Cl.
F16H 48/24          (2006.01)
B60K 23/08          (2006.01)
(Continued)

(52) U.S. Cl.
CPC ............. F16H 48/24 (2013.01); F16H 48/22 (2013.01); F16H 48/40 (2013.01); B60K 23/08 (2013.01);
(Continued)

(58) Field of Classification Search
CPC .... F16H 48/08–11; F16H 48/22; F16H 48/24; F16H 48/40; F16H 48/42; F16H 48/30–2048/346; B60K 23/08
See application file for complete search history.

(56) References Cited

U.S. PATENT DOCUMENTS 4,846,016 A  *  7/1989  Takeuchi ........... B60K 17/3467
                                                          74/473.1
8,851,212 B2 *  10/2014  Kahl ...................... B60K 17/36
                                                          475/221
(Continued)

FOREIGN PATENT DOCUMENTS

CN          109356982 A  *  2/2019  ............... F16H 3/44
DE              817557 C  *  11/1951
(Continued)

OTHER PUBLICATIONS

International Search Report issued Aug. 4, 2023 in PCT/EP2023/059610, filed on Apr. 13, 2023, 2 pages.

*Primary Examiner* — James J Taylor, II

(74) *Attorney, Agent, or Firm* — Oblon, McClelland, Maier & Neustadt, L.L.P.

(57) ABSTRACT

A differential drive device for a transmission system for a motor vehicle, having an axis of rotation (X) includes a planet carrier supporting engagement toothing, notably axial engagement toothing. An output ring gear is rotatable about the axis of rotation and supporting engagement toothing, notably radial engagement toothing. An axially movable blocking sliding gear is provided with engagement toothing, notably radial engagement toothing, and an axially movable connection sliding gear is provided with engagement toothing, notably axial engagement toothing. The connection sliding gear and the blocking sliding gear are movable in order to assume three axial positions: a disconnected position, a connected position, and a blocked position.

20 Claims, 4 Drawing Sheets

(51) Int. Cl.
| | |
|---|---|
| *F16H 48/08* | (2006.01) |
| *F16H 48/22* | (2006.01) |
| *F16H 48/34* | (2012.01) |
| *F16H 48/40* | (2012.01) |

(52) U.S. Cl.
CPC ........ *F16H 48/08* (2013.01); *F16H 2048/346* (2013.01)

(56) References Cited

U.S. PATENT DOCUMENTS

| | | | | |
|---|---|---|---|---|
| 9,162,567 B2 * | 10/2015 | Valente | ................ | B60K 17/344 |
| 9,784,355 B1 * | 10/2017 | Brammer | ............... | B60K 23/08 |
| 10,302,145 B2 * | 5/2019 | Hirao | ...................... | B23F 15/06 |
| 10,876,613 B2 | 12/2020 | Leitner et al. | | |
| 11,686,380 B2 * | 6/2023 | Cao | ......................... | F16H 48/40 |
| | | | | 475/160 |
| 12,270,465 B2 * | 4/2025 | Yang | ....................... | F16H 48/24 |
| 2024/0408960 A1 * | 12/2024 | Yang | ...................... | B60K 17/02 |

FOREIGN PATENT DOCUMENTS

| | | | |
|---|---|---|---|
| EP | 2 876 332 A1 | | 5/2015 |
| JP | 2007333133 A | * | 12/2007 |
| WO | WO 2016/014156 A2 | | 1/2016 |

* cited by examiner

DIFFERENTIAL DRIVE DEVICE

BACKGROUND OF THE INVENTION

Field of the Invention

The invention relates to the field of transmission chains for a motor vehicle.

More specifically, it relates to a transmission system comprising a differential drive device intended to transmit and distribute torque coming from a motor to two wheel shafts of an axle of the vehicle. The differential drive device comprises a first element intended to be driven by a motor and a second element intended to drive one and/or the other of the two wheel shafts of the axle of the vehicle, as well as a coupling device suitable for selectively coupling the first element to the second element.

Description of the Related Art

Patent application US 2006/0270510 describes a differential assembly that comprises a differential box and a pinion box. The pinion box comprises a first pinion and a second pinion. A first side gear and a second side gear are operatively coupled to the first pinion and the second pinion. A sliding band selectively engages at least one from among the pinion box and the first and second side gears. The sliding band thus offers three engagement modes, namely, a disconnected mode, an open mode and a locked mode. The differential assembly comprises a spring assembly that is disposed between the box and the sliding band so as to push this band in the direction opposite that provided by the actuator.

BRIEF SUMMARY OF THE INVENTION

The invention aims to improve this type of device.

Thus, the aim of the invention is a differential drive device for a transmission system for a motor vehicle, having an axis of rotation and comprising:

a planet carrier supporting engagement toothing, notably axial engagement toothing;

an output ring gear rotatable about the axis of rotation and supporting engagement toothing, notably radial engagement toothing;

an axially movable blocking sliding gear provided with engagement toothing, notably radial engagement toothing;

an axially movable connection sliding gear provided with engagement toothing, notably axial engagement toothing;

with the connection sliding gear and the blocking sliding gear being movable in order to assume three axial positions:

a disconnected position, in which the engagement toothing of the connection sliding gear is disconnected from the engagement toothing of the planet carrier, and the engagement toothing of the blocking sliding gear is disconnected from the engagement toothing of the output ring gear;

a connected position, in which the engagement toothing of the connection sliding gear is connected to the engagement toothing of the planet carrier, and the engagement toothing of the blocking sliding gear is disconnected from the engagement toothing of the output ring gear;

a blocked position, in which the engagement toothing of the connection sliding gear is connected to the engagement toothing of the planet carrier, and the engagement toothing of the blocking sliding gear is connected to the engagement toothing of the output ring gear;

a spring arranged to exert a force on the connection sliding gear toward the planet carrier so as to promote, when transitioning from the disconnected position to the connected position, the engagement of the engagement toothing of the connection sliding gear in the engagement toothing of the planet carrier.

Axial engagement toothing comprises teeth that project axially toward the axis of rotation.

Radial engagement toothing comprises teeth that project radially, and therefore perpendicular, to the axis of rotation.

According to the invention, "promoting the engagement of the engagement toothing of the connection sliding gear in the engagement toothing of the planet carrier" is understood to mean that, when transitioning from the disconnected position to the connected position, when the conjugated toothing has a relative angular offset so that their engagement is not immediately possible, the spring, which is compressed, can act on the connection sliding gear as soon as the relative rotation of the toothing places this toothing in a mutual engagement position. The spring thus helps to accelerate the mutual engagement of the conjugated toothing, which improves the dynamics of the differential drive device. Indeed, the spring can move the connection sliding gear more quickly than an actuator can alone since the inertia of the spring is lower.

In the disconnected position, the torque transmission between the motor and the wheels is disconnected.

In the connected position, it is possible to transmit torque between the motor and the wheel shafts by exerting the differential function allowing different speeds of rotation for the two wheel shafts.

Nevertheless, when the two opposite wheels encounter a difference in friction on the road (sticking, etc.), the operation of the differential may need to be blocked in order to rotate the two wheel shafts at the same speed while transmitting different torques.

In the blocked position, the relative movement between the output ring gears is blocked, and the two wheels are forced to rotate at the same speed as the differential box.

According to one of the aspects of the invention, the spring is an axial spring.

According to one of the aspects of the invention, the spring is a prestressed spring. In this case, the spring permanently stores resilient energy, irrespective of its position.

According to one of the aspects of the invention, the blocking sliding gear is rotatably fixed relative to the planet carrier in the connected position.

According to one of the aspects of the invention, the connection sliding gear is axially movable and is rotatably fixed relative to the planet carrier in the connected position.

According to one of the aspects of the invention, the connection sliding gear and the blocking sliding gear are arranged so as to be moved by the same actuator.

According to one of the aspects of the invention, the spring is arranged between an actuator and the connection sliding gear.

According to one of the aspects of the invention, the blocking sliding gear and the connection sliding gear are rigidly translationally connected along the axis of rotation, being produced on the same part, for example.

In another embodiment of the invention, the blocking sliding gear and the connection sliding gear are axially movable relative to each other, and the spring is interposed between the blocking sliding gear and the connection sliding gear so that the connection sliding gear can be axially moved by the blocking sliding gear by means of the spring.

In this case, the spring is notably arranged between the connection and blocking sliding gears.

In this case, the stiffness of the spring is notably such that the blocking sliding gear and the connection sliding gear are axially secured when no obstacle opposes the axial movement of the connection sliding gear and/or of the blocking sliding gear.

According to one of the aspects of the invention, the connection sliding gear is arranged so as to be axially movable relative to the blocking sliding gear, between a stop position on a stop of the blocking sliding gear and an axial retracted position, setback from said stop, in which position the spring is compressed.

According to one of the aspects of the invention, the spring is prestressed when the connection sliding gear is in the stop position against the stop of the blocking sliding gear.

The prestressed spring tends to push the connection sliding gear against this stop.

According to one of the aspects of the invention, the stop on the blocking sliding gear is formed by a circlip secured to this blocking sliding gear.

Thus, the connection sliding gear comes into abutment against this circlip when in the disconnected position.

In the disconnected position, the engagement toothing of the connection sliding gear and the engagement toothing of the planet carrier do not overlap, and the engagement toothing of the blocking sliding gear and the engagement toothing of the output ring gear also do not overlap. The spring then can be in a less stressed state, notably in its initial prestressed state.

In the connected position, the engagement toothing of the connection sliding gear and the engagement toothing of the planet carrier axially overlap, and the spring still can be in a less stressed state, notably in its initial prestressed state.

According to one of the aspects of the invention, the engagement toothing of the connection sliding gear and the engagement toothing of the planet carrier extend axially.

Thus, the spring is not only used to facilitate the engagement of the connection sliding gear by storing energy in the event of interference, but it also promotes the use of axial toothing rather than radial toothing. The use of axial toothing is advantageous since it notably allows a tooth profile with anti-disengagement to be provided. Without a spring, with such axial toothing, the connected/unblocked position would involve using long axial teeth with a partial axial overlap of the teeth of this toothing in order to allow additional axial movement in order to reach the other connected/blocked position, which is not optimal for torque transmission. It is actually preferable for the axial toothing to engage as far as the bottom of the toothing in order to transmit torque. By virtue of the spring, it is possible to use toothing that completely engages with one another in the connected/unblocked position.

According to one of the aspects of the invention, the device comprises a friction device arranged to create a torque deviation between two wheels connected to the differential drive device, notably in the connected mode.

A perfect differential, i.e., without internal friction, would distribute the input torque between the two wheels linked to this differential in a perfectly symmetrical manner, at a ratio of 50/50. In the event that a wheel loses its adhesion (in the presence of an ice or mud patch, for example), the torque on the other wheel also cancels out and the vehicle loses its driveability. By voluntarily adding the friction device that generates constant and/or proportional friction between moving parts of the differential, a torque deviation can be created between the two wheels that is constant or proportional to the input torque, and the crossing capacity of the vehicle can be improved. Without an additional device, the torque deviation between the two wheels is notably of the order of 3 to 5%. With an additional, passive or active friction device, deviations of the order of 30% can be achieved.

According to one of the aspects of the invention, the friction device comprises a stack of friction disks.

According to one of the aspects of the invention, the device further comprises an output ring gear opposite the aforementioned output ring gear and the friction device is placed between this opposite output ring gear and the planet carrier. A first set of friction disks is rotatably secured to the opposite output ring gear, notably by means of teeth and splines. A second set of friction disks is rotatably secured to the planet carrier, notably by means of teeth and splines. The disks of the first set and of the second set are alternately arranged so as to obtain a number of friction surfaces. The conical toothing of the opposite output ring gear allows, during the rotation of said ring gear, the friction disks to be pressed against one another in order to generate friction torque.

In another manner, the first set of friction disks can be driven by the differential box. Thus, manufacturing of the planet carrier is simplified.

In the blocked position, the axial toothing of the connection sliding gear and of the planet carrier notably axially overlap, the connection sliding gear is in axial abutment on the differential box or the planet carrier, the spring is compressed, and the radial engagement toothing of the blocking sliding gear and of the output ring gear radially overlap. The connection sliding gear is in an axial setback position, setback from the stop of the blocking sliding gear.

According to one of the aspects of the invention, the toothing of the planet carrier and the toothing of the output ring gear are arranged inside the differential box.

The toothing of the blocking sliding gear and of the output ring gear, since they are of the radial type, allow a greater overlapping length to be provided that is not detrimental since the dynamics for blocking the differential drive device, which is carried out when the vehicle is stopped, is less critical than the dynamics for the connection/disconnection.

According to one of the aspects of the invention, the device comprises a differential box and the planet carrier can freely rotate in the differential box when the connection sliding gear is in a disconnected position.

The device comprises a differential box and the blocking sliding gear is prismatically connected to the differential box.

According to one of the aspects of the invention, this prismatic connection is implemented by respective axial splines of the blocking sliding gear and of the differential box, which splines are meshed so as to allow a relative translation movement while blocking a relative rotation movement.

According to one of the aspects of the invention, the blocking sliding gear is provided with the radial engagement toothing.

According to one of the aspects of the invention, the engagement toothing of the connection sliding gear and the engagement toothing of the planet carrier have axial engagement toothing, notably of the anti-disengagement type.

In a known manner of the prior art, the anti-disengagement type engagement toothing have undercuts and counter-undercuts with angles selected so as to ensure that the teeth cannot spontaneously disengage while they transmit torque, avoiding untimely disconnection.

In general, the pairs of conjugated toothing can be axial or radial, with or without an anti-disengagement angle.

A further aim of the invention is a transmission system comprising the aforementioned differential drive device and an actuator, with this actuator being arranged to move the blocking sliding gear and the connection sliding gear into the three disconnected, connected and blocked positions, and in a reverse sequence.

Thus, the actuator is arranged to return the sliding gears to the disconnected position.

The blocking sliding gear transmits the force from the actuator to the connection sliding gear, via the spring.

According to one of the aspects of the invention, the blocking sliding gear comprises a groove arranged to engage with the actuator.

BRIEF DESCRIPTION OF THE SEVERAL VIEWS OF THE DRAWINGS

The invention will be more clearly understood, and further aims, details, features and advantages thereof will become more clearly apparent from the following description of several specific embodiments of the invention, which are provided by way of a non-limiting illustration only, with reference to the appended drawings.

DETAILED DESCRIPTION OF THE INVENTION

In the description and the claims, by convention, the axis of rotation, namely, the X axis, of the differential box defines the "axial" orientation. The "radial" orientation is directed orthogonal to the X axis.

Figure 1:
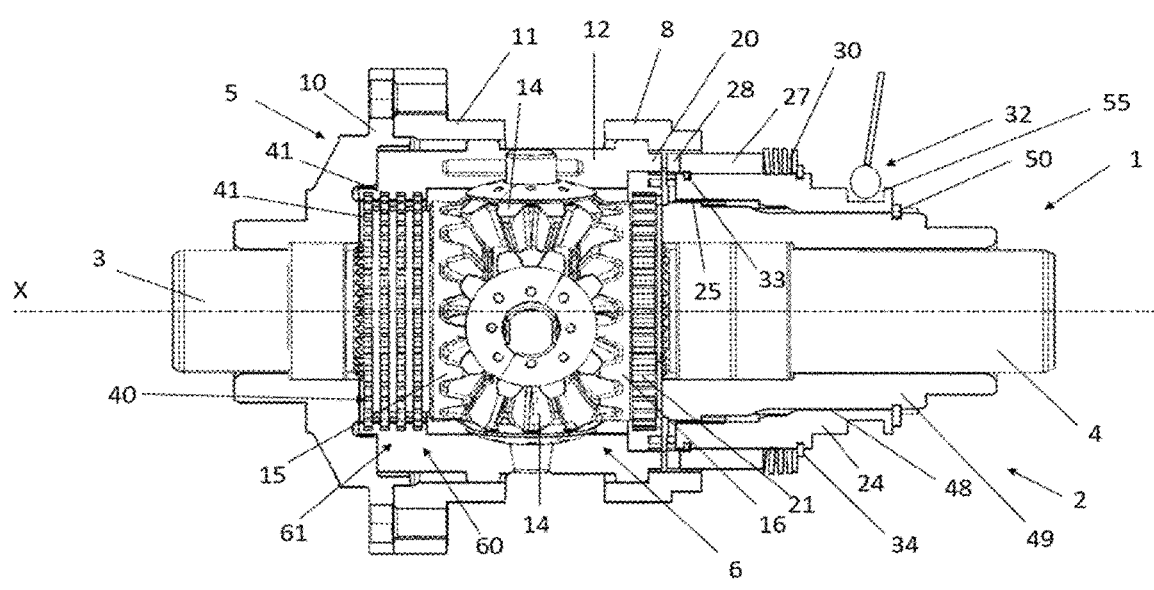
FIG. 1 is a sectional view of a transmission system comprising a differential drive device according to one embodiment of the invention.

FIG. 1 illustrates a transmission system 1 according to one embodiment. The transmission system 1 comprises a differential drive device 2. The differential drive device 2 is intended to set into rotation two wheel shafts 3, 4 of an axle of a vehicle and is configured to distribute torque coming from a motor, not illustrated, to the two wheel shafts 3, 4, allowing them to rotate at different speeds.

Such a transmission system 1 is intended for a hybrid vehicle, for example. Thus, the transmission system 1 is able, for example, to transmit torque from an electric motor to a rear or front axle of the vehicle, while another transmission system, coupled to another motor, such as a combustion engine, is able to generate torque and transmit it between this other motor and the two wheel shafts of the other axle of the vehicle. The vehicle also can be fully electric.

The differential drive device 2 comprises a first assembly 5, able to rotate about the X axis, that is intended to be kinematically coupled to a motor by means of a reducer device, not shown. The differential drive device 2 also comprises a second assembly 6 that is also able to rotate about the X axis and is intended to drive the wheel shafts 3, 4.

The first assembly 5 of the differential drive device 2 comprises a differential box 8. The differential box 8 comprises two parts 10, 11 that are fixed to each other.

The second assembly 6 of the differential drive device 2 comprises an annular shaped planet carrier 12, which is rotatably guided, about the X axis, inside the differential box 8. The second assembly 6 further comprises geared planet gears 14, as well as two geared ring gears 15, 16.

The planet gears 14 are rotatably mounted on the planet carrier 12 about a Y axis, perpendicular to the X axis. In a manner known per se, the planet gears 14 each comprise conical toothing that meshes with complementary conical toothing of the two ring gears 15, 16. The two ring gears 15, 16 are rotatable about the X axis and are each rotatably secured to one of the two wheel shafts 3, 4, respectively. The planet carrier 12, the planet gears 14 and the ring gears 15, 16 thus form a differential allowing the two wheel shafts 3, 4 to rotate, where appropriate, at different speeds.

Figure 5:
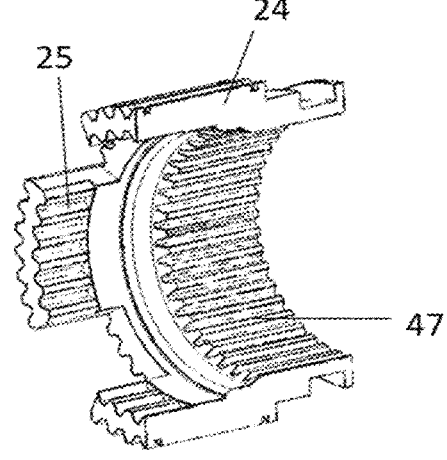
FIG. 5 is a perspective and sectional view of the blocking sliding gear of the differential drive device of FIG. 1.

The differential drive device 2 comprises:

the planet carrier 12 supporting axial engagement toothing 20;

the output ring gear 16 rotating about the axis of rotation X and supporting radial engagement toothing 21;

an axially movable blocking gear 24 provided with radial engagement toothing 25, more clearly shown in FIG. 5;

an axially movable connection sliding gear 27 provided with axial engagement toothing 28.

Figure 2:
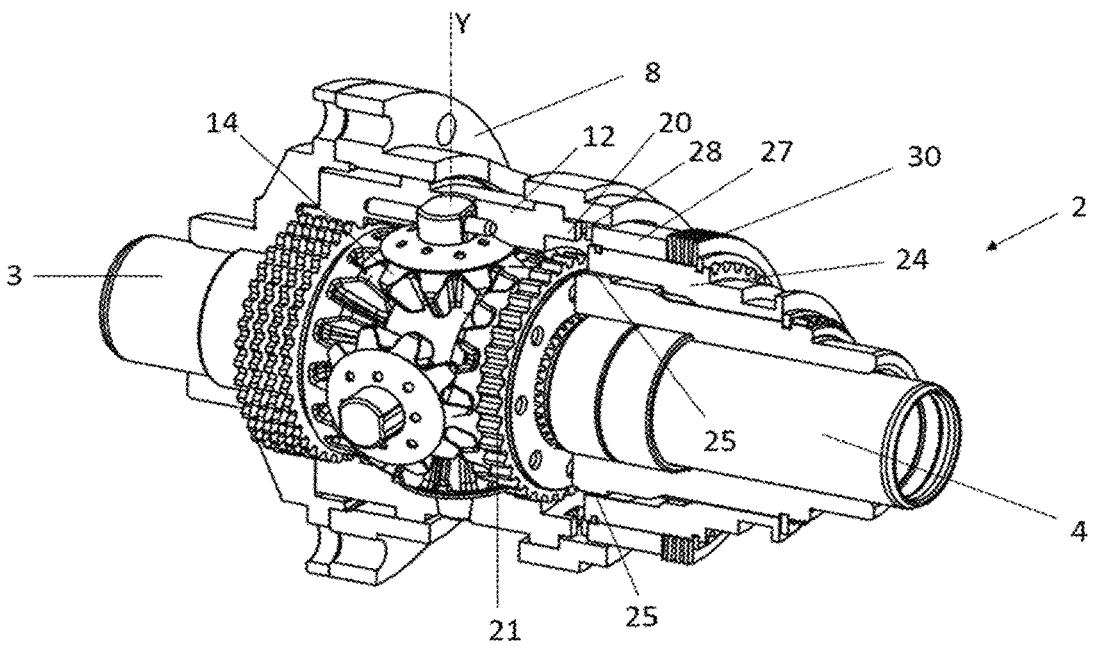
FIG. 2 is a perspective and sectional view of the differential drive device of FIG. 1 in the disconnected position.
Figure 3:
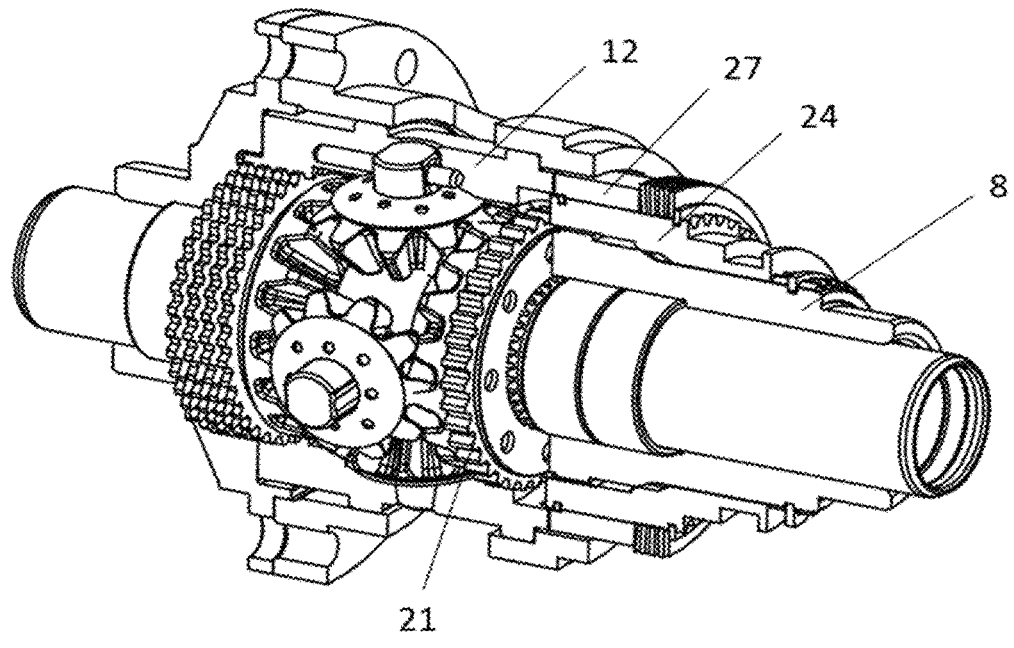
FIG. 3 is a perspective and sectional view of the differential drive device of FIG. 1 in the connected position.
Figure 4:
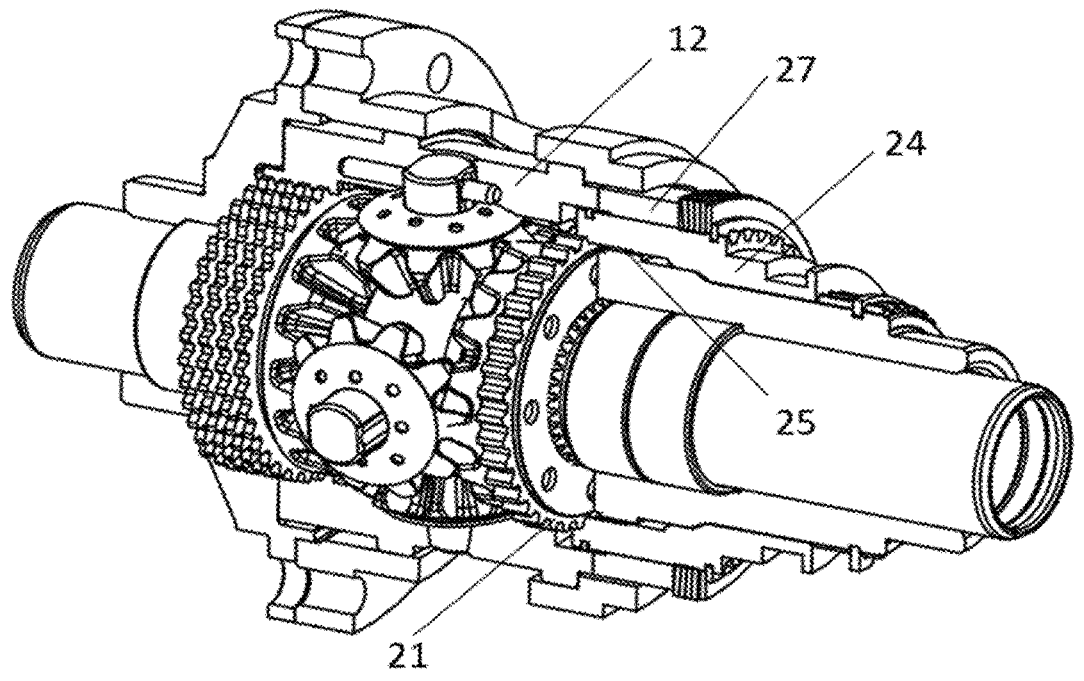
FIG. 4 is a perspective and sectional view of the differential drive device of FIG. 1 in the blocked position.

The connection sliding gear 27 and the blocking sliding gear 24 are movable in order to assume three axial positions:

a disconnected position, in which the engagement toothing 28 of the connection sliding gear 27 is disconnected from the engagement toothing 20 of the planet carrier 12, and the engagement toothing 25 of the blocking sliding gear 24 is disconnected from the engagement toothing 21 of the output ring gear 16 (position illustrated in FIGS. 1 and 2);

a connected position, in which the engagement toothing 28 of the connection sliding gear 27 is connected to the engagement toothing 20 of the planet carrier 12, and the engagement toothing 25 of the blocking sliding gear 24 is disconnected from the engagement toothing 21 of the output ring gear 16 (position illustrated in FIG. 3);

a blocked position, in which the engagement toothing 28 of the connection sliding gear 27 is connected to the engagement toothing 20 of the planet carrier 12, and the engagement toothing 25 of the blocking sliding gear 24 is connected to the engagement toothing 21 of the output ring gear 16 (position illustrated in FIG. 4).

The device 2 further comprises a prestressed axial spring 30 arranged to exert a force on the connection sliding gear 27 toward the planet carrier 12 so as to promote, when transitioning from the disconnected position to the connected position, the engagement of the engagement toothing 28 of the connection sliding gear 27 in the engagement toothing 20 of the planet carrier 12.

This spring 30 is a spiral spring in the example described.

The axial engagement toothing 20 and 28 comprise teeth that project axially toward the axis of rotation.

The radial engagement toothing 21 and 25 comprise teeth that project radially, and therefore perpendicular to the axis of rotation.

In the disconnected position, the torque transmission between the motor and the wheels is disconnected.

In the connected position, torque can be transmitted between the motor and the wheel shafts 2, 3 by exerting the differential function allowing different speeds of rotation to be provided for the two wheel shafts.

In the blocked position, the relative movement between the output ring gears is blocked, and the two wheels are forced to rotate at the same speed as the differential box, independently of any difference in traction between the wheels.

The blocking sliding gear 24 is rotatably fixed relative to the differential box 8. The blocking sliding gear 24 is rotatably fixed relative to the planet carrier 12 in the connected position.

The connection sliding gear 27 is rotatably fixed relative to the differential box 8. The connection sliding gear 27 is axially movable and rotatably fixed relative to the planet carrier 12 in the connected position.

The connection sliding gear 27 and the blocking sliding gear 24 are arranged so as to be moved by the same actuator 32.

In the example described, the blocking sliding gear 24 and the connection sliding gear 27 are axially movable relative to each other, and the spring 30 is interposed between the blocking sliding gear 24 and the connection sliding gear 27 so that the connection sliding gear 27 can be axially moved by the blocking sliding gear 24 by means of the spring 30.

In this case, the spring 30 is arranged between the connection 27 and blocking 24 sliding gears.

The stiffness of the spring 30 is selected such that the blocking sliding gear 24 and the connection sliding gear 27 are axially secured when no obstacle opposes the axial movement of the connection sliding gear 27 and/or of the blocking sliding gear 24.

The connection sliding gear 27 is arranged so as to be axially movable relative to the blocking sliding gear 24, between a stop position on a stop 33 of the blocking sliding gear 24 and an axial setback position, setback from this stop 33, in which the spring 30 is compressed.

The spring 30 is prestressed when the connection sliding gear 27 is in the stop position against the stop 33 of the blocking sliding gear 24.

The prestressed spring 30 tends to push the connection sliding gear 27 against this stop 33 formed by a circlip secured to this blocking sliding gear 24.

Thus, the connection sliding gear 27 comes into abutment against this circlip 33 when in the disconnected position.

The spring 30 bears, at the end of the spring that is opposite the connection sliding gear 27, on a stop formed by a circlip 34.

In the disconnected position, the engagement toothing 28 of the connection sliding gear 27 and the engagement toothing 20 of the planet carrier 12 do not overlap, and the engagement toothing 25 of the blocking sliding gear 24 and the engagement toothing 21 of the output ring gear 16 also do not overlap.

In the connected position, the engagement toothing 28 of the connection sliding gear 27 and the engagement toothing 20 of the planet carrier 12 axially overlap, and the spring 30 is in a less stressed state, in its initial prestressed state.

The engagement toothing 28 of the connection sliding gear 27 and the engagement toothing 20 of the planet carrier 12 extend axially.

The device 2 comprises a friction device 40 arranged to create a torque deviation between the shafts 3, 4 of the two wheels connected to the differential drive device 2, in the connected mode.

By voluntarily adding the friction device 40 that generates constant and/or proportional friction between moving parts of the differential, a torque deviation can be created between the two wheels that is constant or proportional to the input torque, and the crossing capacity of the vehicle can be improved. Without an additional device, the torque deviation between the two wheels is notably of the order of 3 to 5%. With an additional, passive or active friction device, deviations of the order of 30% can be achieved.

The friction device 40 comprises a stack of friction disks 41.

The friction device 40 is placed between the opposite output ring gear 15 and the planet carrier 12.

A first set 60 of friction disks is rotatably secured to the opposite output ring gear 15, notably by means of teeth and splines. A second set 61 of friction disks is rotatably secured to the planet carrier 12, notably by means of teeth and splines. The disks of the first set 60 and of the second set 61 are alternately arranged so as to obtain a number of friction surfaces. The conical toothing of the opposite output ring gear 15 allows, during the rotation of said ring gear, the friction disks 41 to be pressed against one another in order to generate friction torque.

In the blocked position illustrated in FIG. 3, the axial toothing of the connection sliding gear 27 and of the planet carrier 12 axially overlap, the connection sliding gear 27 is in axial abutment on the planet carrier 12, the spring 30 is compressed, and the radial engagement toothing of the blocking sliding gear 24 and of the output ring gear 16 radially overlap.

The toothing 20 of the planet carrier 12 and the toothing 21 of the output ring gear 16 are arranged inside the differential box 8 and inside a gearbox housing. Thus, the movable connection 27 and blocking 24 sliding gears benefit from the lubrication of the gearbox.

The satellite carrier 12 can freely rotate in the differential box 8 when the connection sliding gear 27 is in a disconnected position (FIG. 1).

The blocking sliding gear 24 is prismatically connected to the differential box 8.

This prismatic connection is implemented by respective axial splines 47 and 48 of the blocking sliding gear 24 and of the differential box 8, which splines are meshed so as to allow a relative translation movement while blocking a relative rotation movement.

The splines 48 are produced on a sleeve 49 of the differential box 8.

This sleeve 49 supports a circlip 50 forming a stop for the blocking sliding gear 24.

The engagement toothing 28 of the connection sliding gear 27 and the engagement toothing 20 of the planet carrier 12 have anti-disengagement type axial engagement toothing.

In a known manner of the prior art, the anti-disengagement type engagement toothing have undercuts and counter-undercuts with angles selected so as to ensure that the teeth cannot spontaneously disengage while they transmit torque, avoiding untimely disconnection.

The actuator 32 is arranged to successively move the blocking sliding gear 24 and the connection sliding gear 27 in the three positions, namely, the disconnected (FIGS. 1 and 2), connected (FIG. 3) and blocked (FIG. 4) positions, and in a reverse sequence.

The blocking sliding gear 24 transmits the force from the actuator 32 to the connection sliding gear, via the spring.

The blocking sliding gear 24 comprises a groove 55 arranged to engage with the actuator 32, which in this location assumes the shape of a fork.

The actuator 32 in this case is an actuator of the electromagnetic type.

Figure 6:
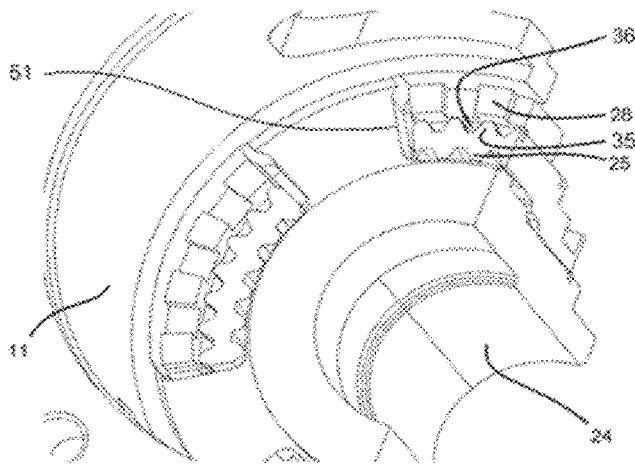
FIG. 6 is a detailed perspective view of the differential box and of the sliding gears of FIG. 1.

FIG. 6 illustrates some details of the blocking 24 and connection 27 sliding gears. For example, it can be seen that complementary axial splines 35, 36 respectively provided on the blocking sliding gear 24 and on the connection sliding gear 27 allow the relative rotation between these two sliding gears 24 and 27 to be blocked. Thus, the connection sliding gear 27 is rotatably secured to the differential box 8 via, on the one hand, the complementary splines 35, 36 that rotatably secure it with the blocking sliding gear 24, and, on the other hand, the axial splines 47 and 48 of the blocking sliding gear 24 and of the differential box 8.

According to an alternative embodiment which is not shown, the blocking sliding gear 24 and the connection sliding gear 27 are rotatably secured to the differential box 8 by virtue of a corresponding shape between the connection sliding gears 27 and the blocking sliding gear 24 and openings 51 of the differential box 8.

Figure 7:
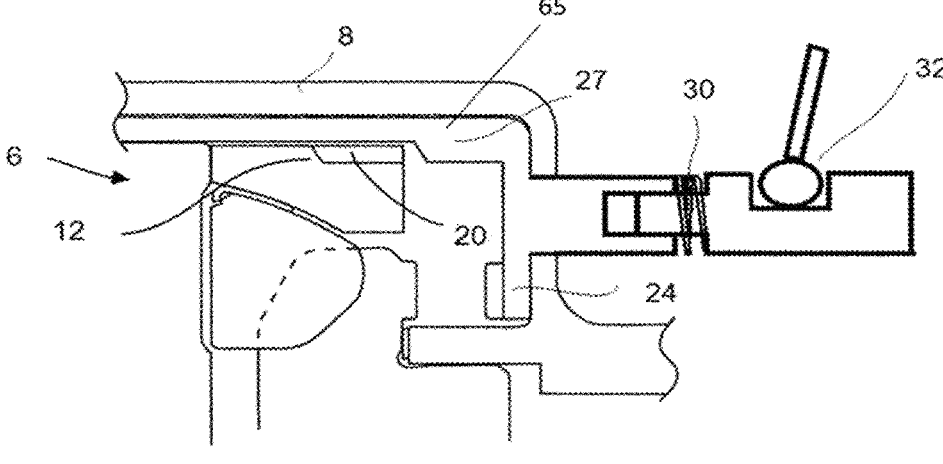
FIG. 7 is a schematic view of a second embodiment.

FIG. 7 schematically shows a second embodiment, in which the connection sliding gear 27 and the blocking sliding gear 24 are axially secured. They can be manufactured from the same part, for example. They jointly form a twin sliding gear 65.

The spring 30 is kinematically arranged between the actuator 32 and the twin sliding gear 65. Thus, the same spring can be used to manage both any engagement interference of the connection sliding gear 27 and any engagement interference of the blocking sliding gear 24.

The invention claimed is:

1. A differential drive device for a transmission system for a motor vehicle, having an axis of rotation and comprising:
   a planet carrier supporting engagement toothing;
   planet gears rotatably mounted on the planet carrier;
   an output ring gear meshing with the planet gears and rotatable about the axis of rotation and supporting engagement toothing;
   an axially movable blocking sliding gear provided with engagement toothing;
   an axially movable connection sliding gear provided with engagement toothing;
   with the connection sliding gear and the blocking sliding gear being movable in order to assume three axial positions:
      a disconnected position, in which the engagement toothing of the connection sliding gear is disconnected from the engagement toothing of the planet carrier, and the engagement toothing of the blocking sliding gear is disconnected from the engagement toothing of the output ring gear;
      a connected position, in which the engagement toothing of the connection sliding gear is connected to the engagement toothing of the planet carrier, and the engagement toothing of the blocking sliding gear is disconnected from the engagement toothing of the output ring gear; and
      a blocked position, in which the engagement toothing of the connection sliding gear is connected to the engagement toothing of the planet carrier, and the engagement toothing of the blocking sliding gear is connected to the engagement toothing of the output ring gear; and
   a spring arranged to exert a force on the connection sliding gear toward the planet carrier so as to promote, when transitioning from the disconnected position to the connected position, the engagement of the engagement toothing of the connection sliding gear in the engagement toothing of the planet carrier,
   wherein the engagement toothing of the output ring gear and the engagement toothing of the movable sliding gear extend radially.

2. The differential drive device as claimed in claim 1, wherein the spring is an axial spring.

3. The differential drive device as claimed in claim 1, wherein the blocking sliding gear is rotatably fixed relative to the planet carrier in the connected position.

4. The differential drive device as claimed in claim 1, wherein the connection sliding gear is axially movable and is rotatably fixed relative to the planet carrier in the connected position.

5. The differential drive device as claimed in claim 1, wherein the spring is arranged between the connection and blocking sliding gears.

6. The differential drive device as claimed in claim 1, wherein the blocking sliding gear and the connection sliding gear are axially movable relative to each other, and the spring is interposed between the blocking sliding gear and the connection sliding gear so that the connection sliding gear can be axially moved by the blocking sliding gear by the spring.

7. The differential drive device as claimed in claim 1, wherein the connection sliding gear is arranged so as to be axially movable relative to the blocking sliding gear, between a stop position on a stop of the blocking sliding gear and an axial setback position, setback from said stop, in which position the spring is compressed.

8. The differential drive device as claimed in claim 1, wherein the engagement toothing of the connection sliding gear and the engagement toothing of the planet carrier extend axially.

9. The differential drive device as claimed in claim 1, comprising a friction device arranged to create a torque deviation between two wheels connected to the differential drive device.

10. The differential drive device as claimed in claim 9, wherein the friction device comprises a stack of friction disks.

11. The differential drive device as claimed in claim 1, wherein the engagement toothing of the connection sliding gear and the engagement toothing of the planet carrier have axial engagement toothing configured to prevent spontaneous disengagement.

12. A transmission system comprising:
   the differential drive device as claimed in claim 1; and
   an actuator configured to move the blocking sliding gear and the connection sliding gear into the three disconnected, connected and blocked positions, and in a reverse sequence.

13. The differential drive device as claimed in claim 2, wherein the blocking sliding gear is rotatably fixed relative to the planet carrier in the connected position.

14. The differential drive device as claimed in claim 2, wherein the connection sliding gear is axially movable and is rotatably fixed relative to the planet carrier in the connected position.

15. The differential drive device as claimed in claim 2, wherein the spring is arranged between the connection and blocking sliding gears.

16. The differential drive device as claimed in claim 2, wherein the connection sliding gear is arranged so as to be axially movable relative to the blocking sliding gear, between a stop position on a stop of the blocking sliding gear and an axial setback position, setback from said stop, in which position the spring is compressed.

17. The differential drive device as claimed in claim 2, wherein the engagement toothing of the connection sliding gear and the engagement toothing of the planet carrier extend axially.

18. The differential drive device as claimed in claim 2, comprising a friction device arranged to create a torque deviation between two wheels connected to the differential drive device.

19. The differential drive device as claimed in claim 2, wherein the engagement toothing of the connection sliding gear and the engagement toothing of the planet carrier have axial engagement toothing configured to prevent spontaneous disengagement.

20. A transmission system comprising:

the differential drive device as claimed in claim 2; and an actuator configured to move the blocking sliding gear and the connection sliding gear into the three disconnected, connected and blocked positions, and in a reverse sequence.

\* \* \* \* \*